United States Patent
Hiranuma

(10) Patent No.: US 8,947,753 B2
(45) Date of Patent: Feb. 3, 2015

(54) IMAGING DEVICE FOR AN IMAGE READING APPARATUS, AND IMAGE READING METHOD

(71) Applicant: Masahiro Hiranuma, Tokyo (JP)

(72) Inventor: Masahiro Hiranuma, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 0 days.

(21) Appl. No.: 13/845,532

(22) Filed: Mar. 18, 2013

(65) Prior Publication Data
US 2013/0250332 A1 Sep. 26, 2013

(30) Foreign Application Priority Data

Mar. 21, 2012 (JP) ................................. 2012-064514
Mar. 7, 2013 (JP) ................................. 2013-045145

(51) Int. Cl.
*H04N 1/46* (2006.01)
*H04N 1/48* (2006.01)

(52) U.S. Cl.
CPC ....................................... *H04N 1/48* (2013.01)
USPC ......... 358/514; 358/474; 358/483; 250/208.1

(58) Field of Classification Search
CPC .......... H04N 1/00928; H04N 1/00933; H04N 1/1013; H04N 1/193; H04N 1/00904; H04N 2201/04774; H04N 2201/04768; H04N 5/3577; H04N 5/3765; H04N 5/378; H04N 3/1581; H04N 1/484; H04N 1/00885; H04N 1/00994; H04N 5/3692; H04N 5/3741; H04N 5/3742
USPC ........................ 358/1.13, 474, 482, 483, 514; 250/208.1
See application file for complete search history.

(56) References Cited

U.S. PATENT DOCUMENTS

| | | | |
|---|---|---|---|
| RE43,892 E * | 1/2013 | Sakakibara et al. | 358/514 |
| 8,665,352 B2 * | 3/2014 | Maeda et al. | 250/208.1 |
| 2005/0146756 A1 * | 7/2005 | Shimizu | 358/482 |
| 2007/0127091 A1 | 6/2007 | Hiranuma | |
| 2010/0276572 A1 * | 11/2010 | Iwabuchi et al. | 250/208.1 |
| 2010/0296134 A1 * | 11/2010 | Yi et al. | 358/474 |
| 2011/0157616 A1 * | 6/2011 | Aoyama et al. | 358/1.13 |
| 2012/0224205 A1 * | 9/2012 | Nakazawa | 358/1.13 |
| 2013/0026348 A1 | 1/2013 | Hiranuma | |

FOREIGN PATENT DOCUMENTS

JP   2006-314039   11/2006

* cited by examiner

*Primary Examiner* — Benny Q Tieu
*Assistant Examiner* — Juan M Guillermety
(74) *Attorney, Agent, or Firm* — Harness, Dickey & Pierce P.L.C.

(57) ABSTRACT

An imaging device includes a plurality of light-receiving units configured to perform photoelectric conversion for different colors, respectively, each light light-receiving unit including a plurality of pixels; a plurality of output units provided for the light-receiving units, each output unit sequentially converting charges of the respective pixels produced by the photoelectric conversion into voltages and sequentially outputting the voltages; a switching unit configured to switch between signal paths so as to alternate output of the voltage between the output units in accordance with a switching signal input from an external device; and an electric-potential applying unit configured to apply an offset potential to the voltages output by the output units until a predetermined time has elapsed since switching between the signal paths by the switching unit.

12 Claims, 13 Drawing Sheets

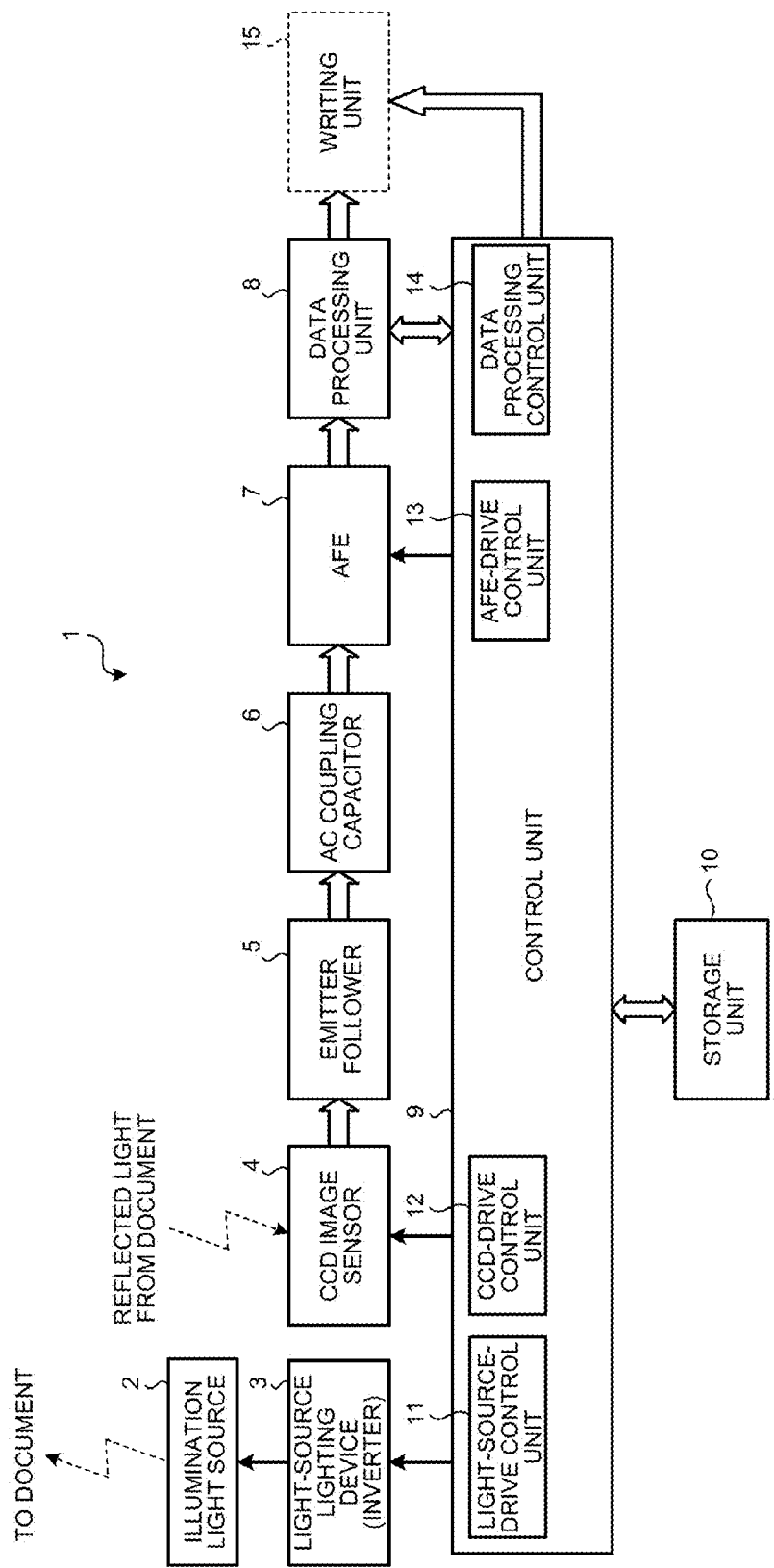

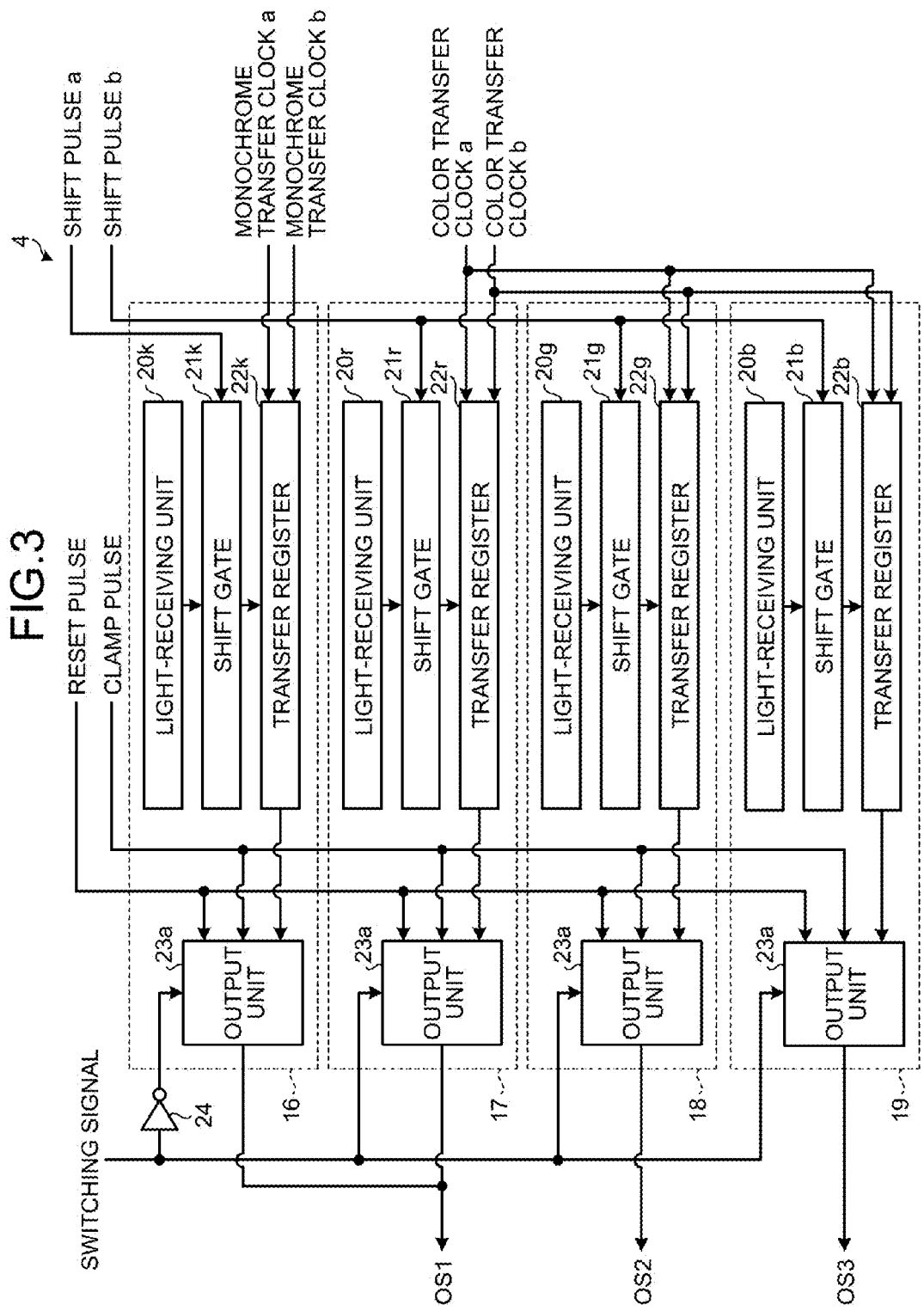

IMAGING DEVICE FOR AN IMAGE READING APPARATUS, AND IMAGE READING METHOD

CROSS-REFERENCE TO RELATED APPLICATIONS

The present application claims priority to and incorporates by reference the entire contents of Japanese Patent Application No. 2012-064514 filed in Japan on Mar. 21, 2012 and Japanese Patent Application No. 2013-045145 filed in Japan on Mar. 7, 2013.

BACKGROUND OF THE INVENTION

1. Field of the Invention

The present invention relates to an imaging device, an image reading apparatus, an image forming apparatus, and an image reading method.

2. Description of the Related Art

A typical image reading apparatus that reads an image of a document or the like includes a CCD (charge coupled device) image sensor and an AFE (analog front end) arranged downstream of the CCD image sensor. An output of the CCD image sensor and an input of an AFE signal are AC (alternating current)-coupled (via a capacitor connected in series, so that only an amount of change (AC) in the output of the CCD image sensor is transferred to the AFE. In other words, the amount of change in the output of the CCD image sensor, that is, an output fluctuation amount, is inevitably transferred to the AFE.

For example, the CCD image sensor accumulates charges in response to incident light regardless of whether a power is on or off. The charge accumulation is a phenomenon that occurs not only when light is purposely applied but also when a small amount of surrounding light is detected. Therefore, when the power of the CCD image sensor is switched from off to on, unnecessary charges accumulated while the power has been off is discharged at once to an output terminal just after the power is turned on, resulting in an overvoltage.

In what is called a 4-line CCD that includes three CCD image sensors for reading color images of R (red), G (green), and B (Blue) and one CCD image sensor for reading a monochrome (BW: black and white) image, an overvoltage may sometimes occur even when the power is not switched from off to on.

For example, when the power of the 4-line CCD is on, and if a color mode for reading a color image and a monochrome mode for reading a monochrome image are switched from one to the other, unnecessary charges accumulated in the CCD image sensor that has not been used (in particular, the one CCD image sensor for reading a monochrome image is not used in the color mode and the three CCD image sensors for reading color images are not used in the monochrome mode) are discharged at once to the output terminal just after the mode is switched, resulting in an overvoltage (see FIG. 7).

If the CCD image sensor temporarily causes an overvoltage that exceeds the rated input voltage of the AFE, the overvoltage is directly transferred to the AFE and may cause characteristic degradation of the AFE device or, in the worst case, cause device breakage. Therefore, some overvoltage preventing means for the AFE have been proposed.

For example, Japanese Patent Application Laid-open No. 2006-314039 discloses a technology, in which a clamp circuit unit that fixes an input offset level at an arbitrary potential by charging or discharging an AC coupling capacitor is provided in an input unit of an analog signal processing circuit unit that is connected to a photoelectric conversion element via the AC coupling capacitor, and a period during which the clamp circuit unit fixes the input offset level at the arbitrary potential is set such that the period employed when the photoelectric conversion element is switched between on and off becomes longer than the period employed when the photoelectric conversion element is not switched between on and off.

However, in the conventional technology, it is only possible to prevent an overvoltage that occurs because unnecessary charges accumulated while the power of the CCD image sensor has been off are discharged at once just after the power of the CCD image sensor is turned on. For example, in what is called a 4-line CCD including color (R/G/B) sensors and a monochrome (BW) sensor, even when the power of the CCD image sensor is maintained in the on state, if the color reading mode and the monochrome reading mode are switched from one to the other, unnecessary charges accumulated in the sensor that has not been used (for example, the monochrome sensor in the case of the color reading mode and the color sensors in the case of the monochrome mode) are discharged at once just after the reading mode is switched, resulting in an overvoltage, which is a problem.

Therefore, there is a need for an imaging device, an image reading apparatus, an image forming apparatus, and an image reading method capable of preventing an overvoltage.

SUMMARY OF THE INVENTION

It is an object of the present invention to at least partially solve the problems in the conventional technology.

According to an embodiment, there is provided an imaging device that includes a plurality of light-receiving units configured to perform photoelectric conversion for different colors, respectively, each light light-receiving unit including a plurality of pixels; a plurality of output units provided for the light-receiving units, each output unit sequentially converting charges of the respective pixels produced by the photoelectric conversion into voltages and sequentially outputting the voltages; a switching unit configured to switch between signal paths so as to alternate output of the voltage between the output units in accordance with a switching signal input from an external device; and an electric-potential applying unit configured to apply an offset potential to the voltages output by the output units until a predetermined time has elapsed since switching between the signal paths by the switching unit.

According to another embodiment, there is provided an image reading apparatus that includes the imaging device according to the above embodiment; and a control unit configured to control the switching unit and the electric-potential applying unit.

According to still another embodiment, there is provided an image forming apparatus that includes an image forming unit configured to form an image read by the image reading apparatus according to the above embodiment.

According to still another embodiment, there is provided an image reading method that includes switching between signal paths in accordance with a switching signal so as to alternately output electrical signals subjected to photoelectric conversion by a plurality of light-receiving units; and applying an offset potential to a voltage output by an output unit until a predetermined time has elapsed since switching between the signal paths.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a block diagram illustrating a configuration example of an image reading apparatus including an imaging device according to an embodiment;

FIG. 3 is a block diagram illustrating a configuration example of the imaging device of the image reading apparatus according to the embodiment;

DETAILED DESCRIPTION OF THE PREFERRED EMBODIMENTS

Figure 2A:
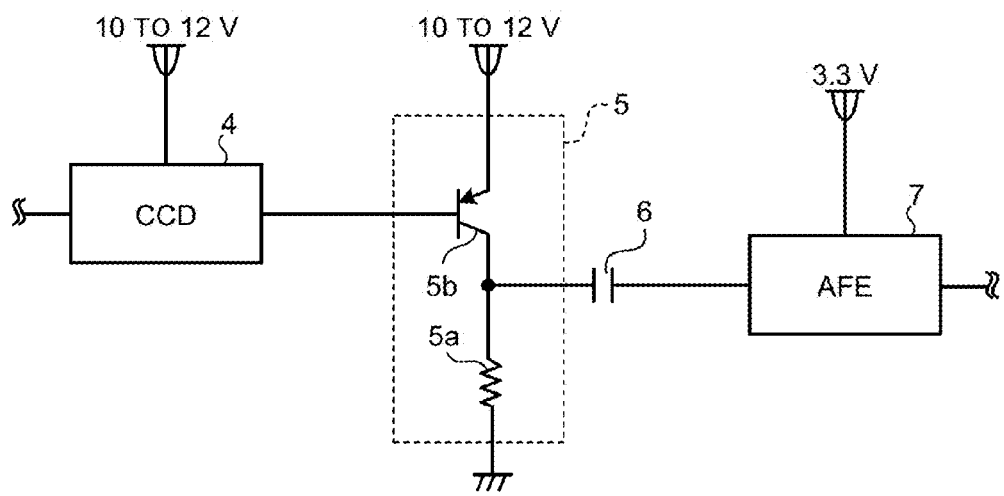
FIG. 2A is a diagram illustrating a configuration of an emitter follower.

Exemplary embodiments of the present invention will be explained in detail below with reference to the accompanying drawings. FIG. 1 is a block diagram illustrating a configuration example of an image reading apparatus 1 including an imaging device 4 according to an embodiment.

The image reading apparatus 1 includes an illumination light source 2, a light-source lighting device (inverter) 3, the imaging device 4, an emitter follower 5, an AC (alternating-current) coupling capacitor 6, an AFE (analog front end) 7, a data processing unit 8, a control unit 9, and a storage unit 10.

The illumination light source 2 is a light source that radiates light to a document from which an image is to be read. The light-source lighting device 3 is a circuit for lighting the illumination light source 2.

The imaging device 4 includes a CCD (Charge Coupled Device) including, for example, four CCD image sensors. For example, the imaging device 4 is what is called a 4-line CCD including three CCD image sensors for reading color images of R (red), G (green), and B (Blue) and one CCD image sensor for reading a monochrome (BW: black and white) image.

Each of the CCD image sensors includes, for example, a light-receiving unit that performs photoelectric conversion on a plurality of pixels for each color, a shift gate, a transfer register, and an output unit (which will be explained later with reference to FIGS. 3 and 4), and converts light reflected from the document into an electrical signal (analog image signal). The output unit converts a charge of each pixel subjected to the photoelectric conversion by the light-receiving unit for each color into a voltage, and sequentially outputs the voltages. In the CCD image sensor, the light-receiving unit may be configured to have a function of the transfer register. Hereinafter, the imaging device 4 may be described as a CCD image sensor or simply as a CCD. In addition, the CCD image sensor may be described simply as a CCD.

The emitter follower 5 matches impedance between the imaging device 4 and the AFE 7. The AC coupling capacitor 6 removes a direct-current (DC) offset of an output voltage of the CCD so that the voltage of the analog image signal output by the imaging device 4 can fall within the input rated voltage of the AFE 7.

The AFE 7 is an IC (Integrated Circuit) in which functions of A/D (analog-to-digital) conversion, an S/H (sample-and-hold) circuit, and gain adjustment are integrated. One of the most important functions of the AFE 7 is to convert an analog image signal input to the AFE 7 into a digital image signal. In addition, the AFE 7 may have a clamp function (electric-potential applying function) to stabilize the level of the input analog image signal at a desired fixed voltage level, an AGC (auto gain control) function to adjust a peak level of the converted digital image signal to a desired level, a black offset adjustment function to set a black level that is used as a reference of image signals to a desired output level, and the like.

The data processing unit 8 performs various types of data processing, such as shading correction or gamma correction, on the digital image signal output by the AFE 7. The processed digital image data is directly sent to a writing unit 15 or temporarily stored in the storage unit 10 via the control unit 9 and thereafter sent to the writing unit 15 via the control unit 9. The writing unit 15 is provided in, for example, an image forming apparatus (see FIG. 12).

The control unit 9 controls each of the units included in the image reading apparatus 1. The control unit 9 includes a light-source-drive control unit 11, a CCD-drive control unit 12, an AFE-drive control unit 13, and a data processing control unit 14.

The light-source-drive control unit 11 controls driving of the light-source lighting device 3 in order to control the amount of light emitted by the illumination light source 2. Specifically, the light-source lighting device 3 inputs (applies) a DC voltage or inputs a PWM (pulse width modulation) signal to thereby control the amount of light emitted by the illumination light source 2.

The CCD-drive control unit 12 controls driving of the imaging device 4. Specifically, the CCD-drive control unit 12 selects a reading mode, in which the imaging device 4 is caused to read a document, from among a plurality of reading modes provided in the imaging device 4, and gives an instruction on the mode to the imaging device 4.

The AFE-drive control unit 13 controls driving of the AFE 7. The data processing control unit 14 controls the data processing unit 8. The storage unit 10 stores therein various types of drive setting data and digital image data subjected to data processing by the data processing unit 8. The storage unit 10 is, for example, a memory, such as a ROM (read only memory) or a RAM (random access memory), or a storage medium, such as an HDD (hard disk drive). The various types of drive setting data include drive setting data of the illumination light source 2 and the light-source lighting device 3, drive setting data of the imaging device 4, drive setting data of the AFE 7, data-processing setting data of the data processing unit 8, and the like.

Operation of the image reading apparatus 1 will be explained below. Light emitted by the illumination light source 2 is applied to a document, and the reflected light from the document is input to the imaging device 4 via a plurality of mirrors (not illustrated). The imaging device 4 is driven based on the drive setting data of the imaging device 4 stored in the storage unit 10, and outputs an analog image signal corresponding to the input light intensity. The analog image signal is input to the AC coupling capacitor 6 via the emitter follower 5. The analog image signal just output by the imaging device 4 is superimposed with a certain offset voltage. However, the offset voltage exceeds the input rated voltage of the AFE 7 and cannot be input as it is to the AFE 7. Therefore, the AC coupling capacitor 6 removes the offset of the analog image signal so that the voltage does not exceed the input rated voltage of the AFE 7.

Figure 2B:
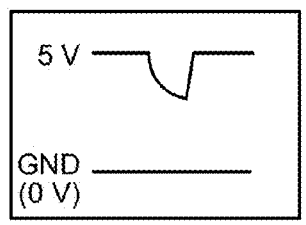
FIG. 2B is a diagram illustrating an analog image signal just output by the imaging device.
Figure 2C:
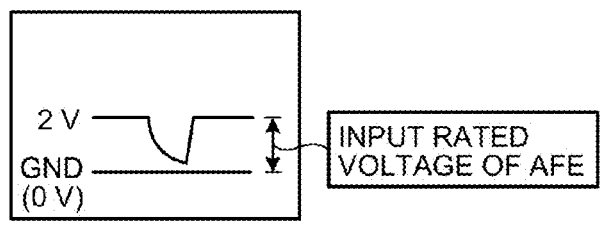
FIG. 2C is a diagram illustrating an analog image signal to be input to an AFE.

FIGS. 2A to 2C are diagrams for explaining operation of the emitter follower 5 with respect to the analog image signal output by one of the CCD image sensors of the imaging device 4. The imaging device 4 includes a plurality of the COD image sensors as described above, and the emitter follower 5 is connected to each of the CCD image sensors.

FIG. 2A is a diagram illustrating a configuration of the emitter follower 5. FIG. 2B is a diagram illustrating an analog image signal just output by the imaging device 4. FIG. 2C is a diagram illustrating an analog image signal to be input to the AFE 7. As illustrated in FIG. 2A, the emitter follower 5 includes a resistor 5a and a transistor 5b. One end of the resistor 5a is grounded. In the transistor 5b, a first input-output terminal is connected to one end of the resistor 5a, a second input-output terminal is connected to a power supply potential (in the example, 10 to 12 volts (V)), and a control terminal receives an output signal from the imaging device 4.

In the example illustrated in FIG. 2A, the power supply voltage of the imaging device 4 is 10 to 12 V. The analog image signal output by the imaging device 4 (see FIG. 2B) is a signal in which a negative-pulse analog image signal is superimposed on the offset voltage of 5 V. Meanwhile, the power supply voltage of the AFE 7 is 3.3 V, the input rated voltage is set to 0 to 2 V, and the offset voltage is 2 V. Therefore, it is impossible to input the output signal of the imaging device 4 as it is to the AFE 7. Therefore, the AC coupling capacitor 6 converts the output signal of the imaging device 4 into a signal in which a negative-pulse analog image signal is superimposed on the offset voltage of 2 V (see FIG. 2C), and the converted signal is input to the AFE 7. The voltage values described above are mere examples in the embodiment of the present invention, and the present invention is not limited thereto.

When an amplitude value of the analog image signal output by the imaging device 4 is 2 V or greater, and if the offset voltage is set to 2 V, the amplitude value of the analog image signal greater than 2 V reaches the ground potential (GND). In other words, the analog image signal becomes lower than the lower limit of the input rated voltage of the AFE 7 and adversely affects the AFE 7, so that characteristic degradation or, in the worst case, device breakage occurs. Therefore, it is preferable to use the amplitude value of the analog image signal within the range of the input rated voltage of the AFE 7.

FIG. 3 is a block diagram illustrating a configuration example of the imaging device 4 included in the image reading apparatus 1 according to the embodiment. The imaging device 4 is, for example, the 4-line CCD as described above, and includes four CCD image sensors 16 to 19 and a switching unit 24 formed of, for example, an inverting circuit. The switching unit 24 switches between signal paths according to a switching signal input from an external apparatus so that output units 23a, which will be described later, can alternately output voltages (for example, monochrome and color are alternately switched).

The CCD image sensor 16 is a CCD image sensor for reading a monochrome image, and includes a light-receiving unit 20k, a shift gate 21k, a transfer register 22k, and the output unit 23a. The light-receiving unit 20k converts light energy into an electrical signal (photoelectric conversion) and temporarily accumulates signal charges. The shift gate 21k transfers the charges accumulated by the light-receiving unit 20k to the transfer register 22k according to an input shift pulse a.

The transfer register 22k transfers the charges transferred from the shift gate 21k to the output unit 23a in synchronization with input monochrome transfer clocks a and b. Specifically, the transfer register 22k shifts the charge of one pixel to the output unit 23a at every cycle of the two-phase monochrome transfer clocks a and b.

The output unit 23a of the CCD image sensor 16 receives a reset pulse and a clamp pulse, converts the signal charge transferred from the transfer register 22k into a voltage, and outputs an analog output signal (OS1) from an output terminal according to an input switching signal. The output unit 23a of the CCD image sensor 16 is configured to receive a switching signal inverted by the switching unit 24.

The CCD image sensor 17 is a CCD image sensor for reading an image of R (red), and includes a light-receiving unit 20r, a shift gate 21r, a transfer register 22r, and the output unit 23a. The light-receiving unit 20r converts light energy for red into an electrical signal (photoelectric conversion) and temporarily accumulates signal charges. The shift gate 21r transfers the charges accumulated by the light-receiving unit 20r to the transfer register 22r according to an input shift pulse b.

The transfer register 22r transfers the charges transferred from the shift gate 21r to the output unit 23a in synchronization with input color transfer clocks a and b. Specifically, the transfer register 22r shifts the charge of one pixel to the output unit 23a at every cycle of the two-phase color transfer clocks a and b.

The output unit 23a of the CCD image sensor 17 receives the reset pulse and the clamp pulse, converts the signal charge transferred from the transfer register 22r into a voltage, and outputs the analog output signal (OS1) from an output terminal according to an input switching signal. The output unit 23a of the CCD image sensor 17 configured to directly receive the switching signal.

The CCD image sensor 18 is a CCD image sensor for reading an image of G (green), and includes a light-receiving unit 20g, a shift gate 21g, a transfer register 22g, and the output unit 23a. The light-receiving unit 20g converts light energy for green into an electrical signal (photoelectric conversion) and temporarily accumulates signal charges. The shift gate 21g transfers the charges accumulated by the light-receiving unit 20g to the transfer register 22g according to the input shift pulse b.

The transfer register 22g transfers the charges transferred from the shift gate 21g to the output unit 23a in synchronization with the input color transfer clocks a and b. Specifically, the transfer register 22g shifts the charge of one pixel to the output unit 23a at every cycle of the two-phase color transfer clocks a and b.

The output unit 23a of the CCD image sensor 18 receives the reset pulse and the clamp pulse, converts the signal charge transferred from the transfer register 22g into a voltage, and outputs an analog output signal (OS2) from an output terminal according to an input switching signal. The output unit 23a of the CCD image sensor 18 is configured to directly receive the switching signal.

The CCD image sensor 19 is a CCD image sensor for reading an image of B (blue), and includes a light-receiving unit 20b, a shift gate 21b, a transfer register 22b, and the output unit 23a. The light-receiving unit 20b converts light energy for blue into an electrical signal (photoelectric conversion) and temporarily accumulates signal charges. The shift gate 21b transfers the charges accumulated by the light-receiving unit 20b to the transfer register 22b according to the input shift pulse b.

The transfer register 22b transfers the charges transferred from the shift gate 21b to the output unit 23a in synchronization with the input color transfer clocks a and b. Specifically, the transfer register 22b shifts the charge of one pixel to the output unit 23a at every cycle of the two-phase color transfer clocks a and b.

The output unit 23a of the CCD image sensor 19 receives the reset pulse and the clamp pulse, converts the signal charge transferred from the transfer register 22b into a voltage, and outputs an analog output signal (OS3) from an output terminal according to an input switching signal. The output unit 23a of the CCD image sensor 19 is configured to directly receive the switching signal.

The switching signal is a signal input by the CCD-drive control unit 12 (FIG. 1) and is used to switch between a monochrome mode for reading a monochrome image and a color mode for reading a color image. The analog image signal (OS1) output by the imaging device 4 is switched between an analog image signal corresponding to a monochrome image in the monochrome mode and an analog image signal corresponding to an image of R (red) in the color mode (see FIG. 3).

In other words, the imaging device 4 outputs only the analog image signal (OS1: one channel) corresponding to a monochrome image in the monochrome mode and outputs the analog image signals (OS1 to OS3: three channels) corresponding to RGB in the color mode. The configuration of the imaging device 4 is not limited to the configuration illustrated in FIG. 3. For example, the imaging device 4 may be configured to separately output odd pixels (ODD) and even pixels (EVEN) by 2 channels (ch) to read a monochrome image at a high speed.

Hereinafter, when it is not necessary to specify any one of the transfer registers 22k, 22r, 22g, and 22b, each of them may be described simply as "the transfer register 22". Furthermore, when it is not necessary to specify any one of the monochrome transfer clocks a and b and the color transfer clocks a and b, each of them may be described simply as "the transfer clocks a and b".

Figure 4:
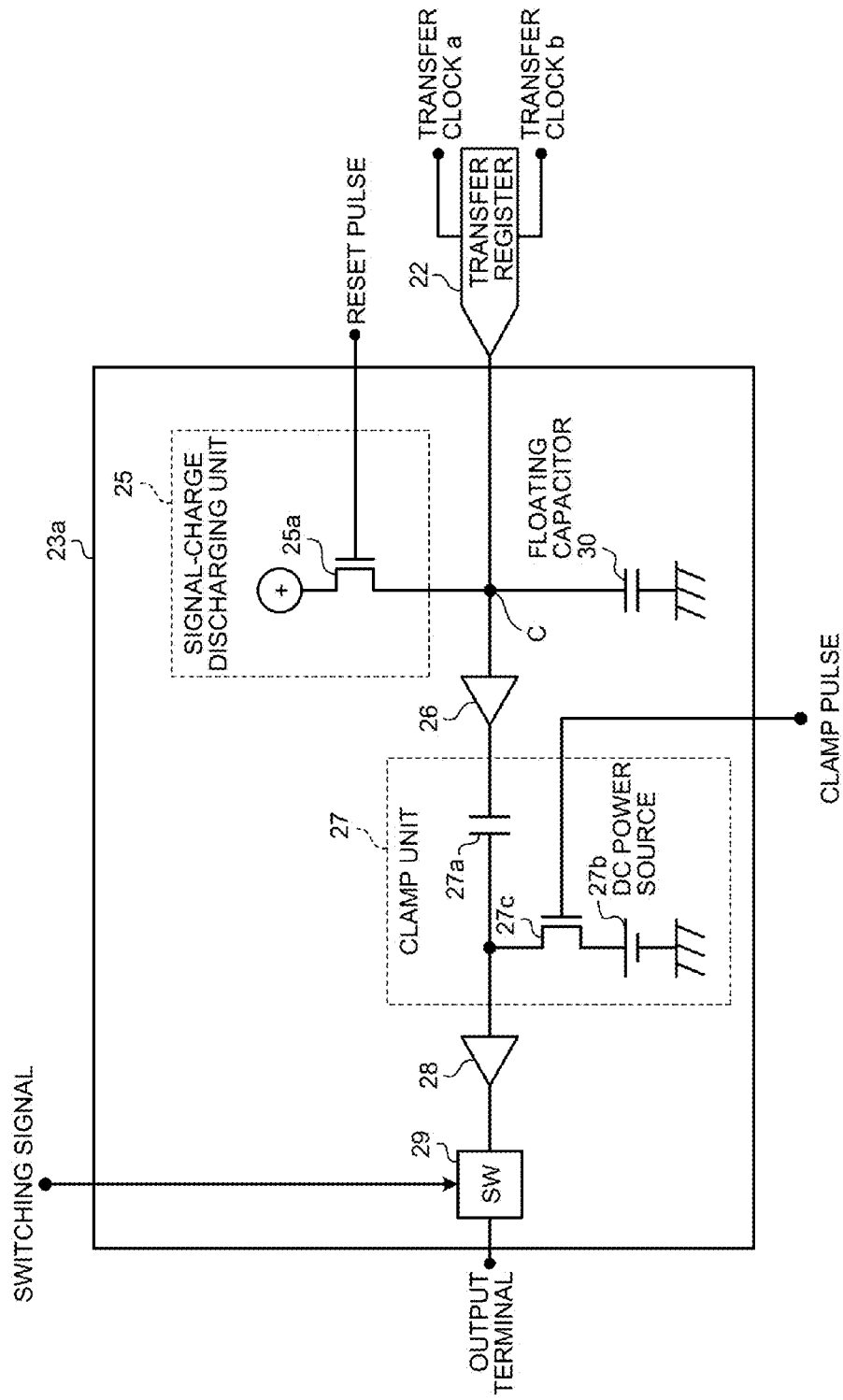
FIG. 4 is a block diagram illustrating configurations of an output unit and peripheral devices.
Figure 5:
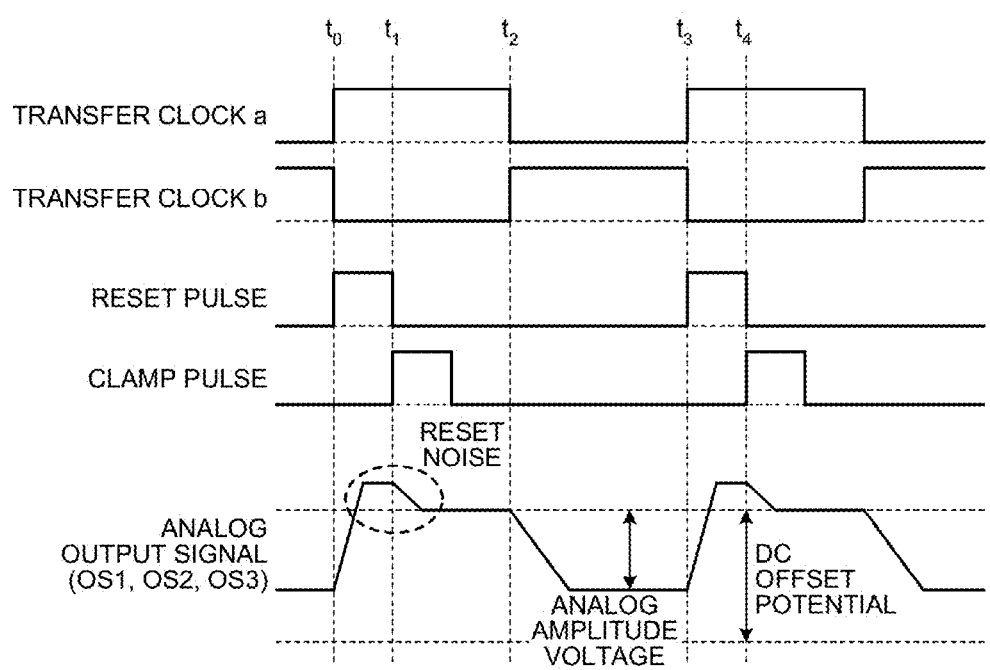
FIG. 5 is a timing diagram illustrating operation of the output unit and the peripheral devices illustrated in FIG. 4 in a color mode.

The output unit 23a will be explained in detail below. FIG. 4 is a block diagram illustrating configurations of the output unit 23a and peripheral devices. FIG. 5 is a timing diagram illustrating operation of the output unit 23a and the peripheral devices illustrated in FIG. 4 in the color mode.

As illustrated in FIG. 4, the output unit 23a includes, for example, a signal-charge discharging unit 25, amplifiers 26 and 28, a clamp unit (electric-potential applying unit) 27, a switch 29, and a floating capacitor 30. As described above, the transfer register 22 transfers the charges transferred from the shift gate 21 to the output unit 23a in synchronization with the transfer clocks a and b.

The floating capacitor 30 is connected between the output terminal of the transfer register 22 and the ground potential. The signal-charge discharging unit 25 includes a transistor 25a. A first input-output terminal of the transistor 25a is connected to a connection point C between the output terminal of the transfer register 22 and the floating capacitor 30. A second input-output terminal of the transistor 25a is connected to a power supply potential on the high-potential side. A reset pulse is input to a control terminal of the transistor 25a.

Therefore, while the reset pulse remains at high level, the transistor 25a remains in the on state, the potential at the connection point C is pulled up to the power supply potential on the high-potential side, and a signal charge (electron) is discharged. The amplifier 26 amplifies the potential of the connection point C and outputs the amplified potential.

The clamp unit 27 includes a capacitor 27a, a DC power source 27b, and a transistor 27c. One end of the capacitor 27a is connected to an output terminal of the amplifier 26. A low-potential output terminal of the DC power source 27b is connected to the ground potential. A first input-output terminal of the transistor 27c is connected to a high-potential output terminal of the DC power source 27b. A second input-output terminal of the transistor 27c is connected to the other end of the capacitor 27a. The transistor 27c also serves as an output terminal of the clamp unit 27. While the clamp pulse remains at high level, the transistor 27c remains in the on state and the potential of the output terminal of the clamp unit 27 is clamped (potential is applied) at the potential (a DC offset potential) of the DC power source 27b.

The amplifier 28 amplifies the potential of the output terminal of the clamp unit 27 and outputs the amplified potential. The switch 29 outputs the output signal of the amplifier 28 to an output terminal according to the switching signal.

As illustrated in FIG. 5, the transfer clock a is an inverted signal of the transfer clock b. At time $t_0$, when the transfer clock a changes from low level to high level, when the transfer clock b changes from high level to low level, and when the reset pulse changes from low level to high level, the transistor 25a of the signal-charge discharging unit 25 (FIG. 4) is turned on and the analog output signals (for example, OS1, OS2, and OS3) change to high level.

Thereafter, at time $t_1$, when the reset pulse changes from high level to low level and the clamp pulse changes from low level to high level, the transistor 25a of the signal-charge discharging unit 25 is turned off and the transistor 27c of the clamp unit 27 is turned on. When the transistor 27c is turned on, the analog output signals (OS1, OS2, and OS3) are clamped at the DC offset potential. Before or after time $t_1$, overshoot occurs on the analog output signals (OS1, OS2, and OS3). The overshoot is called a reset noise.

At time $t_2$, when the transfer clock a changes from high level to low level and the transfer clock b changes from low level to high level, an analog amplitude voltage proportional to the reflected light from the document is added to the DC offset potential and is output as the analog output signals (OS1, OS2, and OS3).

At time $t_3$, when the reset pulse changes from low level to high level, the analog amplitude voltage is reset and the reset noise is superimposed on the analog output signals (OS1, OS2, and OS3).

At time $t_4$, when the clamp pulse changes from low level to high level, the analog output signals (OS1, OS2, and OS3) are clamped and stabilized at the DC offset potential that is a reference of the output signal of the CCD image sensor.

In other words, charges accumulated in the transfer register 22 are sequentially transferred to the output unit 23a in synchronization with the transfer clocks a and b. Charges accumulated in the transfer register 22 at the end of the transfer are discharged to the signal-charge discharging unit 25 by the reset pulse. The analog output signal is reset by the reset pulse and thereafter clamped at the DC offset potential by the clamp pulse.

Figure 6:
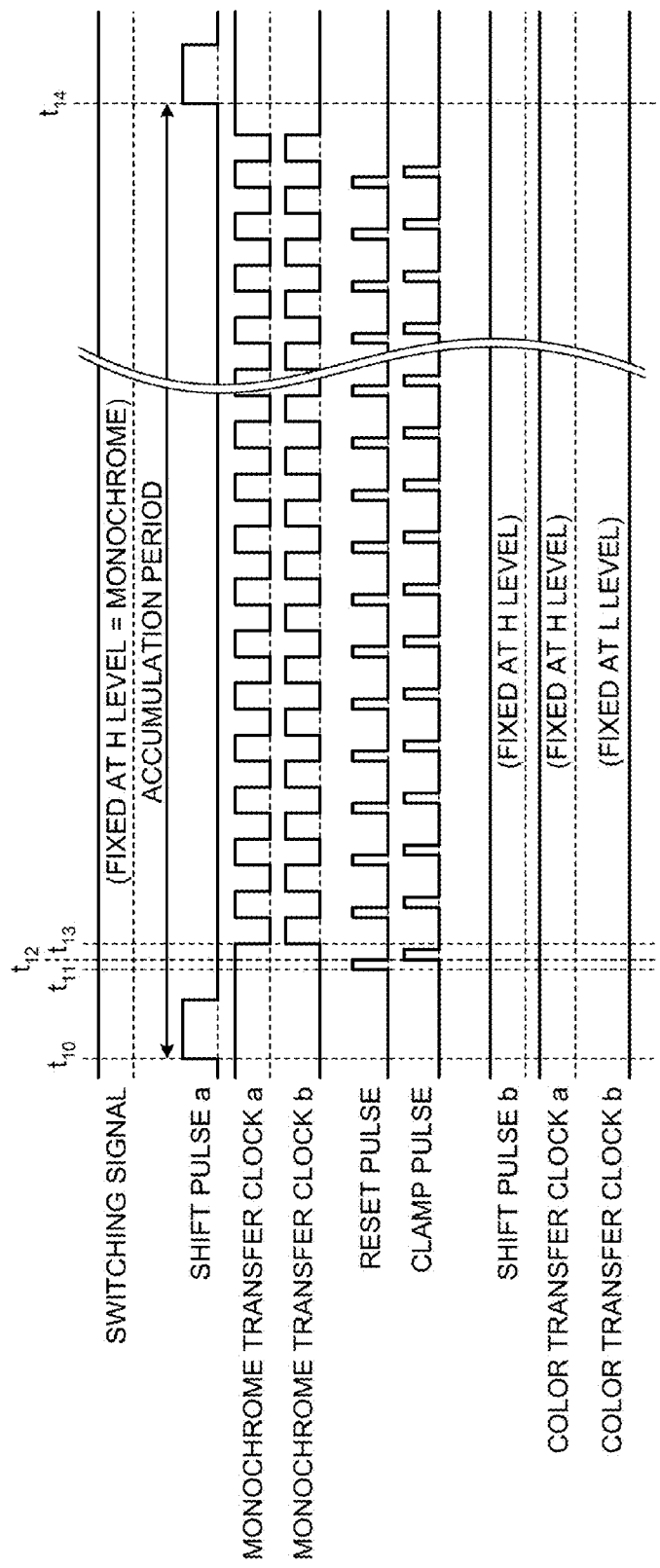
FIG. 6 is a timing diagram illustrating an operation example of the imaging device illustrated in FIG. 3 in a monochrome mode for reading a monochrome image.

FIG. 6 is a timing diagram illustrating an operation example of the imaging device 4 illustrated in FIG. 3 in the monochrome mode for reading a monochrome image. In the imaging device 4 in the monochrome mode, the switching signal, the shift pulse b, and the color transfer clock b are fixed at high level and the color transfer clock a is fixed at low level.

At time $t_{10}$, when the shift pulse a changes from low level to high level, charges accumulated by the light-receiving unit 20k are transferred to the transfer register 22k. From time $t_{11}$, the reset pulse repeatedly switches between low level and high level at predetermined duty ratio and cycle. From time $t_{12}$, the clamp pulse repeatedly switches between low level and high level at predetermined duty ratio and cycle.

From time $t_{13}$, the monochrome transfer clocks a and b repeatedly switch between low level and high level at predetermined duty ratio and cycle. A monochrome analog output signal is output in synchronization with the monochrome transfer clocks a and b. At time $t_{14}$, the shift pulse a changes from low level to high level. During the period from the time $t_{10}$ to time $t_{14}$ (one cycle of the shift pulse a) corresponds to a charge accumulation period.

In this way, it is not necessary to drive the CCD image sensors 17 to 19 in the monochrome mode. Therefore, each of the shift pulse b and the color transfer clocks a and b can be fixed at high level or low level. Namely, the imaging device 4 stops unnecessary circuit operation to reduce power consumption and suppress unnecessary radiation (EMI: electromagnetic interference).

In the color mode, the switching signal is switched to and fixed at low level, the shift pulse a and the monochrome transfers clock a and b are fixed at high level or low level, and the shift pulse b and the color transfer clocks a and b are input.

In the imaging device 4 illustrated in FIG. 6, the reset pulse and the clamp pulse are commonly used both in the color mode and the monochrome mode. However, an input terminal for the reset pulse and an input terminal for the clamp pulse may be provided individually for each of the color mode and the monochrome mode.

Operation Example of Comparative Example

Figure 7:
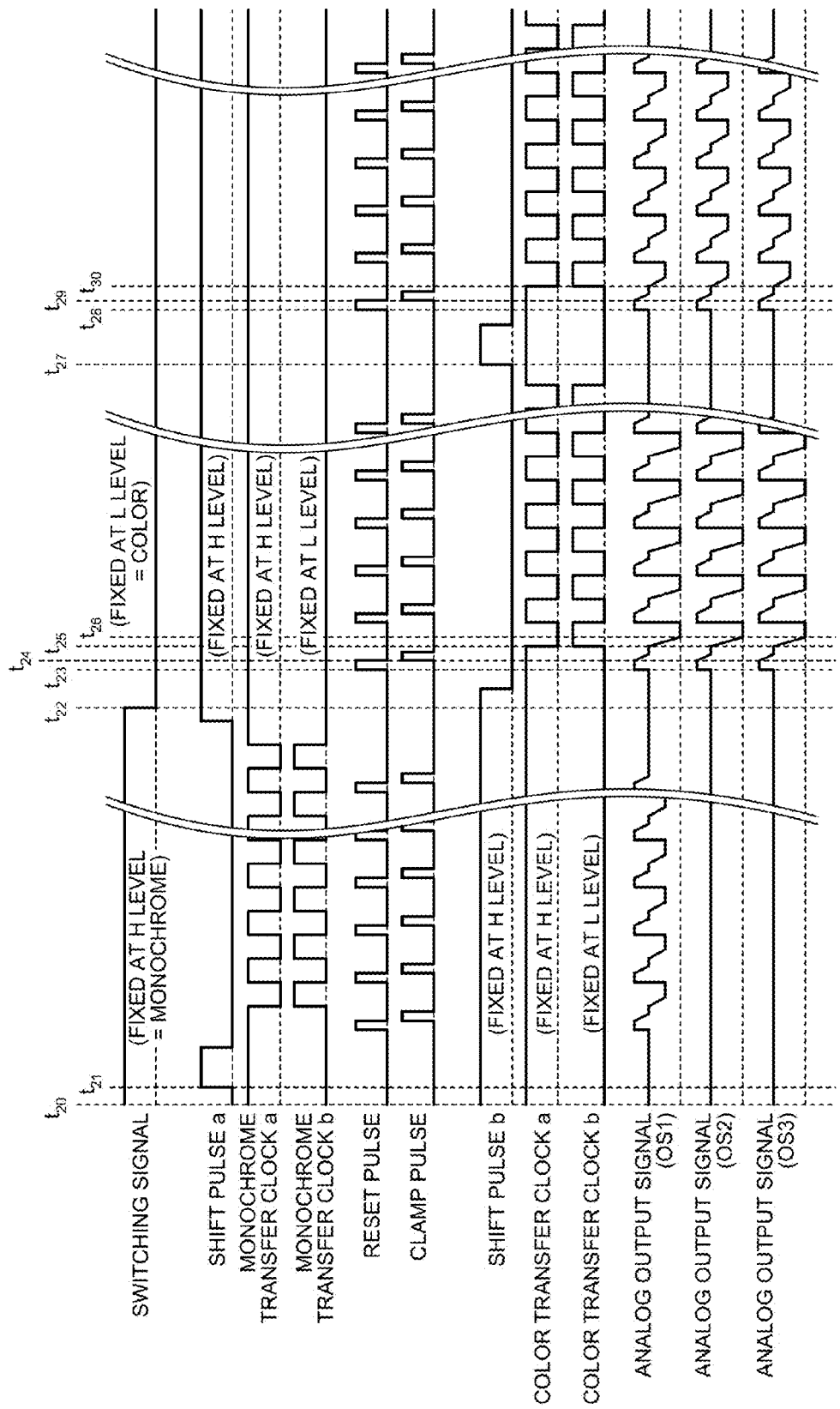
FIG. 7 is a timing diagram illustrating operation of a 4-line CCD of a comparative example.

As described above, in the 4-line CCD, all of the CCD image sensors accumulate charges according to incident light. FIG. 7 is a timing diagram illustrating operation of a 4-line CCD of a comparative example.

As illustrated in FIG. 7, in the 4-line CCD of the comparative example, at initial time t20, the switching signal is at high level (the monochrome mode). At time $t_{21}$, when the shift pulse a changes from low level to high level, accumulated charges are transferred to the transfer register (the shift register). Thereafter, when the reset pulse, the clamp pulse, the monochrome transfer clocks a and b are supplied, the analog output signal (OS1) proportional to the reflected light from the document is output.

At time $t_{22}$, the switching signal changes from high level (the monochrome mode) to low level (the color mode). From time $t_{23}$, the reset pulse repeatedly switches between low level and high level at predetermined duty ratio and cycle. When the reset pulse changes to high level, the reset noise is superimposed on the analog output signals (OS1, OS2, and OS3).

From time $t_{24}$, the clamp pulse repeatedly switches between low level and high level at predetermined duty ratio and cycle. When the clamp pulse changes to high level, the analog output signals (OS1, OS2, and OS3) are clamped at the DC offset potential.

From time $t_{25}$, the color transfer clocks a and b repeatedly switch between low level and high level at predetermined duty ratio and cycle. Accordingly, charges accumulated in the R/G/B CCD image sensors that are not used during the period from time $t_{20}$ to time $t_{22}$ are discharged. At time $t_{26}$, the analog output signals (OS1, OS2, and OS3) reach the ground potential (GND) and fall below the lower limit of the input rated voltage of the AFE as illustrated in FIG. 7.

Thereafter, when a fixed time has elapsed and all of unnecessary charges accumulated in the R/G/B CCD image sensors while the R/G/B CCD image sensors have not been used are discharged, normal operation is resumed (the state in which a voltage level corresponding to the input light intensity is output). At time $t_{27}$, the shift pulse b changes from low level to high level. From time $t_{28}$, the reset pulse repeatedly switches between low level and high level at predetermined duty ratio and cycle.

When the reset pulse changes to high level, the reset noise is superimposed on the analog output signals (OS1, OS2, and OS3). From time $t_{29}$, the clamp pulse repeatedly switches between low level and high level at predetermined duty ratio and cycle. When the clamp pulse changes to high level, the analog output signals (OS1, OS2, and OS3) are clamped at the DC offset potential. From time $t_{30}$, the color transfer clocks a and b repeatedly switch between low level and high level at predetermined duty ratio and cycle. Accordingly, the analog output signals (OS1, OS2, and OS3) proportional to the reflected light from the document are output.

In this way, in the operation example of the comparative example, an overvoltage occurs in the AFE when the monochrome mode is switched to the color mode. While the example is explained in FIG. 7 that the monochrome mode is switched to the color mode, according to the operation example of the comparative example, an overvoltage also occurs in the AFE when the color mode is switched to the monochrome mode.

Operation Example of Embodiment

Figure 8:
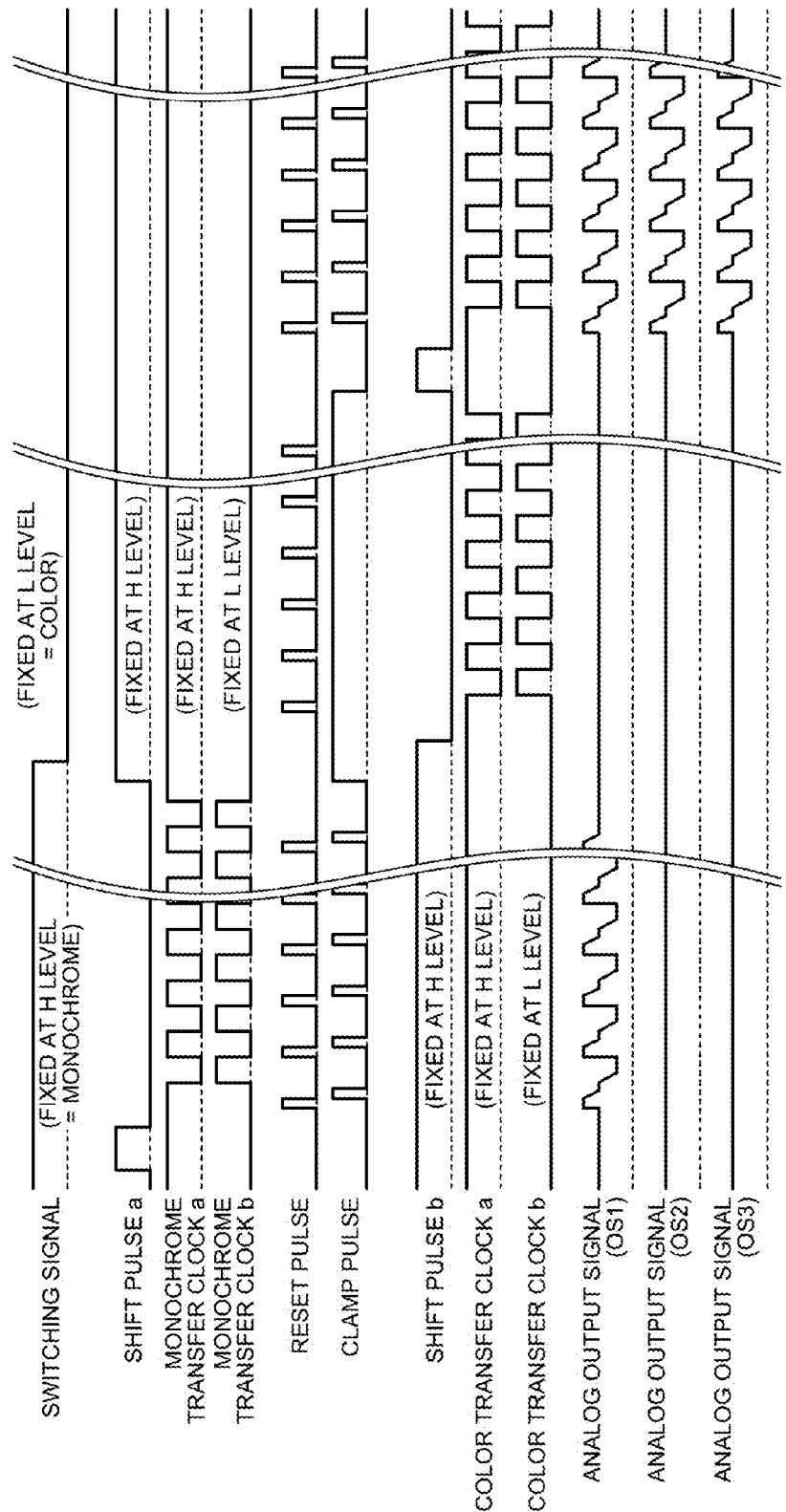
FIG. 8 is a timing diagram illustrating an operation example of the image reading apparatus according to the embodiment.

FIG. 8 is a timing diagram illustrating an operation example of the image reading apparatus 1 (the 4-line CCD) according to the embodiment. As illustrated in FIG. 8, in the image reading apparatus 1 according to the embodiment, the clamp pulse is kept asserted from just before (or before or after) the switching signal is switched from high level (the monochrome mode) to low level (the color mode) to when a predetermined period (a predetermined time $T_{WAIT}$) elapses. The clamp pulse is asserted by the control of the CCD drive control unit 12 (FIG. 1).

The predetermined time $T_{WAIT}$ is represented by Expression (1) below, where $Q_{ALL}$ is a total amount of charges accumulated by the CCD image sensors 16 to 19 (a total amount of charges that can be accumulated in all circuits for one channel), $Q_{REG}$ is a total amount of charges accumulated by the transfer register 22, and $T_{line}$ (minutes) is a minimum time (accumulation period) needed to transfer all the charges by the transfer register 22.

$$T_{WAIT} > Q_{ALL}/Q_{REG} \times T_{line}(\min) \quad (1)$$

If the clamp pulse is kept asserted when the monochrome mode is switched to the color mode, unnecessary charges accumulated in the CCD image sensors 17 to 19 are discharged, so that the potential of the output terminal of the imaging device 4 reaches the DC offset potential.

In this way, if the CCD-drive control unit 12 keeps asserting the clamp pulse for a predetermined period before the monochrome mode is switched to the color mode (or before the color mode is switched to the monochrome mode), it becomes possible to prevent output of an overvoltage due to the unnecessary charges accumulated in the CCD image sensors 17 to 19 (or in the CCD image sensor 16). The clamp pulse and the reset pulse may be supplied separately to the CCD image sensors 17 to 19 and the CCD image sensor 16.

Modifications of the output unit 23*a* will be explained below.

First Modification

Figure 9:
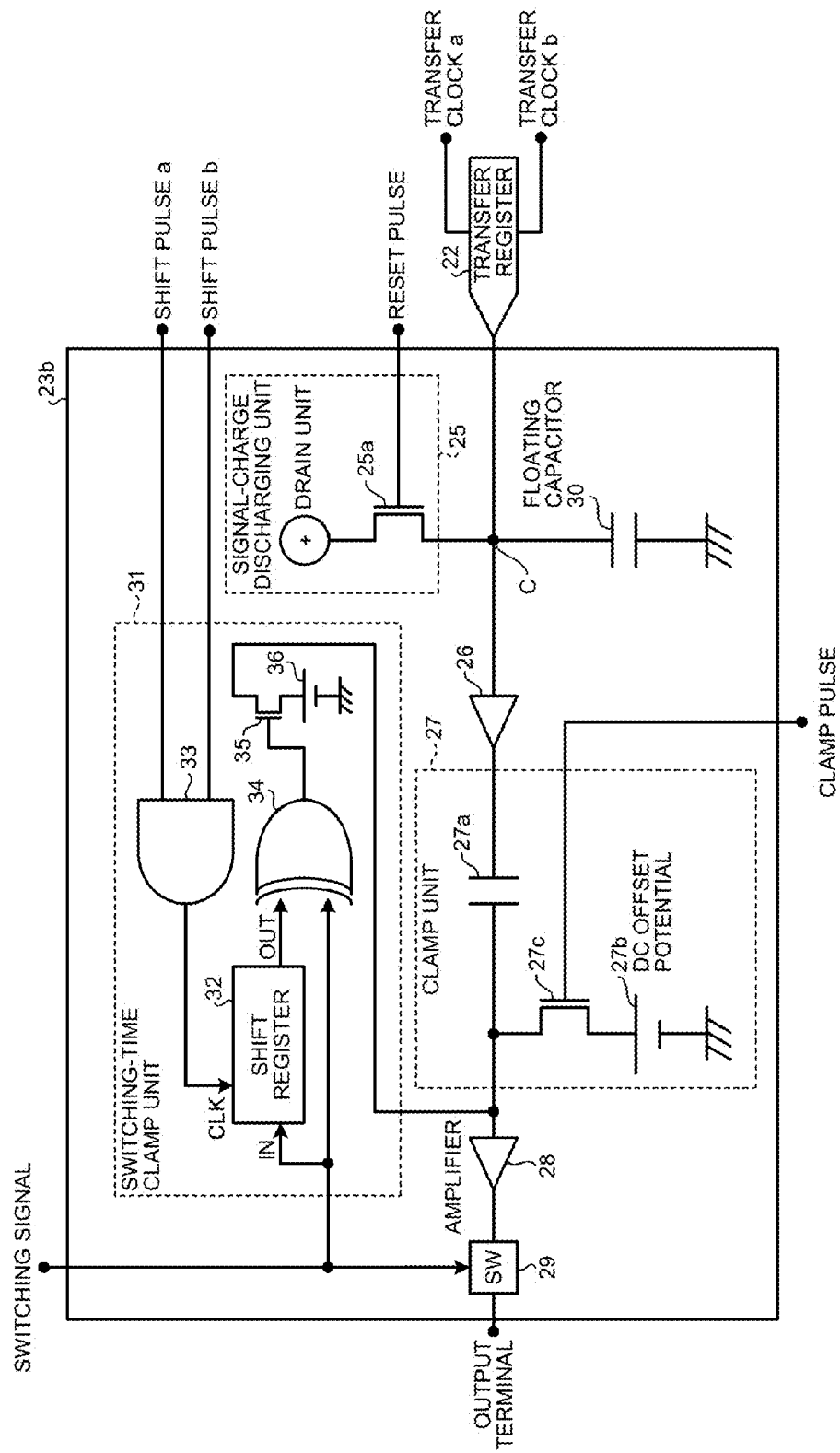
FIG. 9 is a block diagram illustrating a configuration of a first modification of the output unit and the peripheral devices.

FIG. 9 is a block diagram illustrating a configuration of a first modification (an output unit 23*b*) of the output unit 23*a* and the peripheral devices. The output unit 23*b* is different from the output unit 23*a* illustrated in FIG. 4 in that it includes a switching-time clamp unit (electric-potential applying unit) 31.

The switching-time clamp unit 31 includes a shift register 32, an AND circuit 33, an XOR circuit 34, a transistor 35, and a DC power source 36. The shift register 32 functions as a delay circuit that delays a switching signal in accordance with a clock CLK input by the AND circuit 33. A delay time by which the switching signal is delayed by the shift register 32 is determined in advance. The AND circuit 33 generates the clock CLK by calculating a logical AND of the shift pulses a and b, and outputs the clock CLK to the shift register 32. For example, the shift register 32 may be configured to function as a delay circuit that delays the switching signal by a period from when the switching signal is input to when any of the shift pulses a and b is input a several times (for example, ten times).

The XOR circuit 34 receives a switching signal and the switching signal delayed by the shift register 32, calculates an exclusive OR, and outputs the calculation result to the transistor 35. A first input-output terminal of the transistor 35 is connected to an output terminal of the DC power source 36 on the high-potential side. A second input-output terminal of the transistor 35 is connected to an input side of the amplifier 28. The transistor 35 remains in the on state while the output of the XOR circuit 34 remains at high level, and the potential of the input side of the amplifier 28 is clamped at the potential of the DC power source 36 (the DC offset potential).

Figure 10:
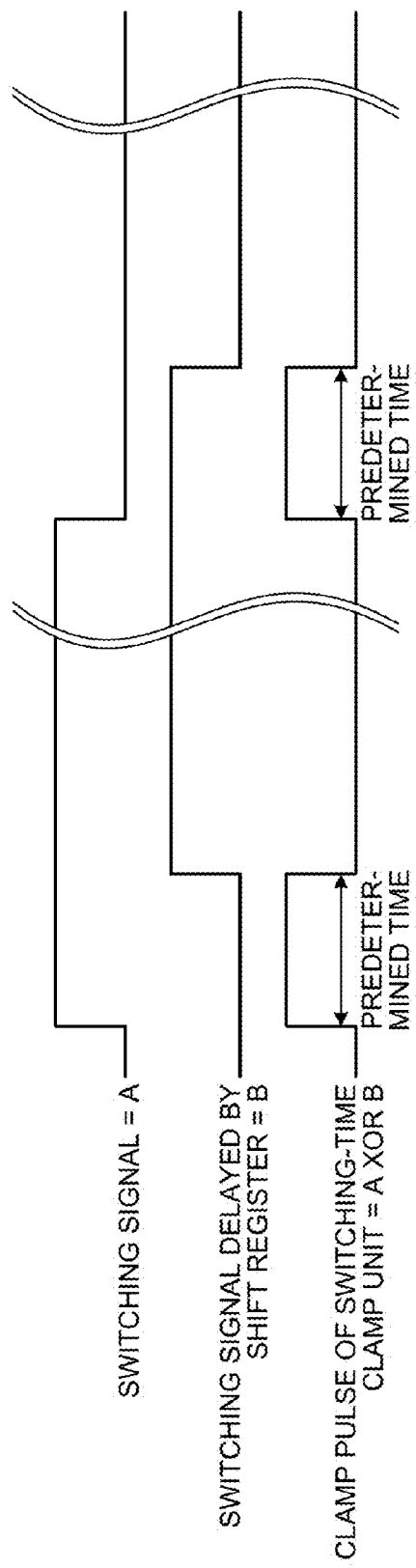
FIG. 10 is a timing diagram illustrating a timing at which a switching-time clamp unit clamps an input side of an amplifier at a DC offset potential.

FIG. 10 is a timing diagram illustrating a timing at which the switching-time clamp unit 31 clamps the input side of the amplifier 28 at the DC offset potential. As illustrated in FIG. 10, for example, when a switching signal A is input to the output unit 23*b*, the shift register 32 delays the switching signal A in accordance with the clock CLK input by the AND circuit 33, and outputs a switching signal B. Therefore, the XOR circuit 34 generates a pulse with a predetermined time width by calculating an exclusive OR (XOR) of the switching signal A and the switching signal B.

In other words, the switching-time clamp unit 31 clamps the potential of the input side of the amplifier 28 at the potential of the DC power source 36 (DC offset potential) for a predetermined time illustrated in FIG. 10. The predetermined time illustrated in FIG. 10 corresponds to the predetermined time $T_{WAIT}$ as described above.

A time in which the XOR circuit 34 of the switching-time clamp unit 31 outputs the clamp pulse (the signal is clamped at the DC offset potential) is, as illustrated in FIGS. 8 and 10, a time from just before (or before or after) the monochrome mode is switched to the color mode (or the color mode is switched to the monochrome mode) by the switching signal to when a predetermined time (the predetermined time $T_{WAIT}$) elapses.

Second Modification

Figure 11:
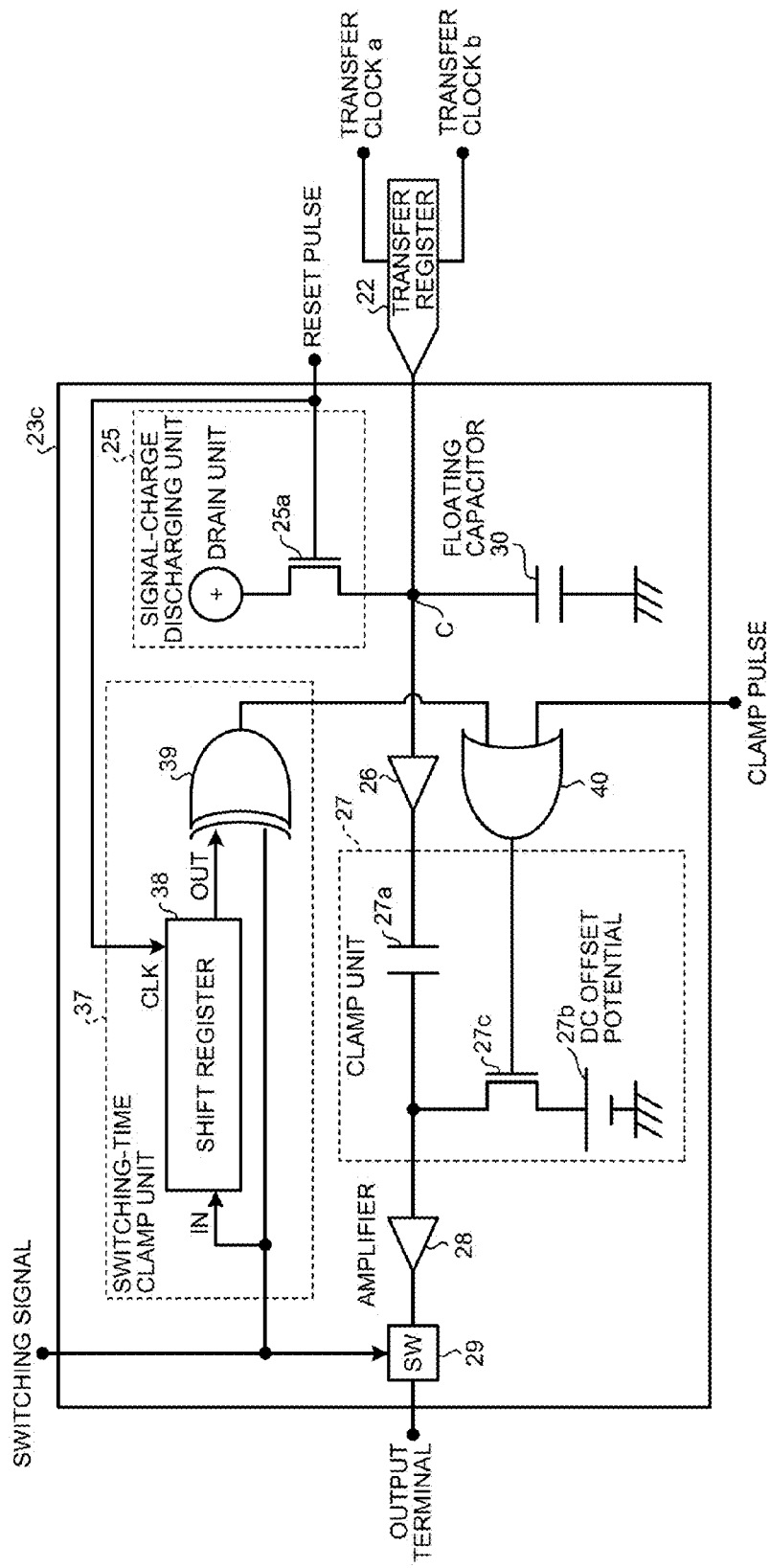
FIG. 11 is a block diagram illustrating a configuration of a second modification of the output unit and the peripheral devices.

FIG. 11 is a block diagram illustrating a configuration of a second modification (an output unit 23*c*) of the output unit 23*a* and the peripheral devices. The output unit 23*c* is different from the output unit 23*a* illustrated in FIG. 4 in that it includes a switching-time clamp unit (electric-potential applying unit) 37 and an OR circuit 40.

The switching-time clamp unit 37 includes a shift register 38 and an XOR circuit 39. The shift register 38 functions as a delay circuit that delays a switching signal by using the reset pulse as the clock CLK. For example, the shift register 38 may be configured to function as a delay circuit that delays the switching signal until charges accumulated by the CCD image sensor 16 or the CCD image sensors 17 to 19 that have not output electrical signals since input of the switching signal are discharged. The XOR circuit 39 receives a switching signal and the switching signal delayed by the shift register 38, calculates an exclusive OR, and outputs the calculation result to the OR circuit 40.

The OR circuit 40 calculates a logical OR of a pulse output by the XOR circuit 39 and the clamp pulse, and outputs the calculation result to the transistor 27*c*. The transistor 27*c* remains in the on state while the output of the OR circuit 40 remains at high level, and the potential of the input side of the amplifier 28 is clamped at the potential of the DC power source 36 (the DC offset potential). The switching-time clamp unit 37 or the OR circuit 40 clamps the signal for approximately the same period as the predetermined time $T_{WAIT}$ employed by the switching-time clamp unit 31.

A time in which the switching-time clamp unit 37 outputs the clamp pulse (the signal is clamped at the DC offset potential) is, as illustrated in FIGS. 8 and 10, a time from just before (or before or after) the monochrome mode is switched to the color mode (or the color mode is switched to the monochrome mode) by the switching signal to when a predetermined time (the predetermined time $T_{WAIT}$) elapses.

Figure 12:
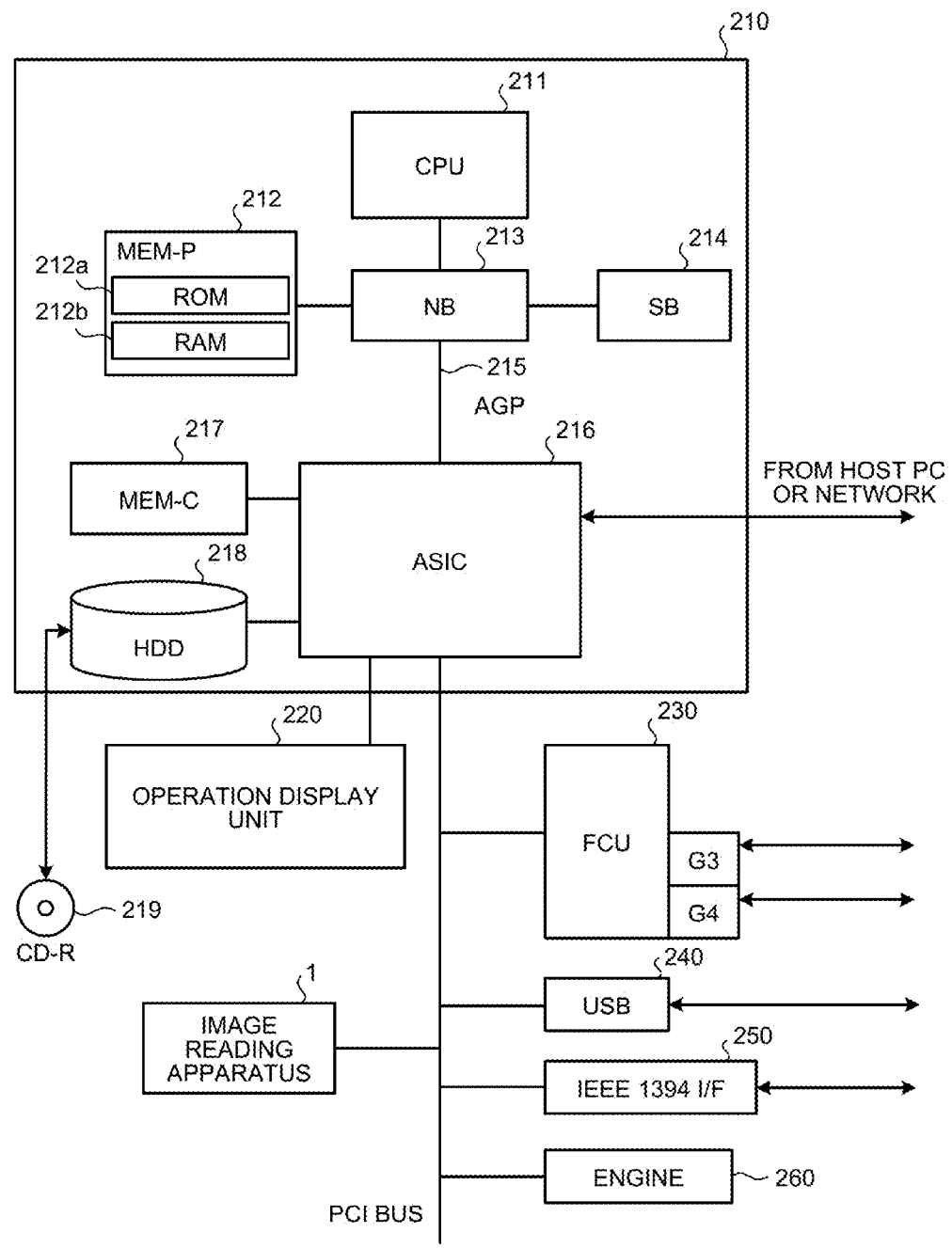
FIG. 12 is a block diagram illustrating an example of a hardware configuration of an image forming apparatus including the image reading apparatus.

The image reading apparatus according to the embodiment may be integrated with an image forming apparatus. FIG. 12 is a block diagram illustrating an example of a hardware configuration of the image forming apparatus including the image reading apparatus 1. As illustrated in FIG. 12, the image forming apparatus includes a controller 210 and an engine unit (Engine) 260, which are connected to each other via a PCI (Peripheral Component Interface) bus. The controller 210 is a controller that controls the entire image forming apparatus, picture processing, communications, and input operation through an operation display unit 220. The engine unit 260 is a printer engine or the like that is connectable to the PCI bus. Examples of the engine unit 260 include a black and white plotter, a one-drum color plotter, a four-drum color plotter, a scanner, and a facsimile unit. The engine unit 260 may include an image processing section for performing error diffusion, gamma correction, or the like, in addition to what is called an engine section, such as a plotter.

The controller 210 includes a CPU (central processing unit) 211, a north bridge (NB) 213, a system memory (MEM-P) 212, a south bridge (SB) 214, a local memory (MEM-C)

217, an ASIC (Application Specific Integrated Circuit) 216, and an HDD 218. The NB 213 and the ASIC 216 are connected to each other via an AGP (Accelerated Graphics Port) bus 215. The MEM-P 212 includes a ROM 212a and a RAM 212b.

The CPU 211 controls the entire image forming apparatus. The CPU 211 includes a chip set formed of the NB 213, the MEM-P 212, and the SB 214. The CPU 211 is connected to other apparatuses via the chip set.

The NB 213 is a bridge for connecting the CPU 211, the MEM-P 212, the SB 214, and the AGP bus 215 to one another. The NB 213 includes a memory controller for controlling read and write with respect to the MEM-P 212, and also includes a PCI master and an AGP target.

The MEM-P 212 is a system memory used as a memory for storing computer programs or data, a memory for loading computer programs or data, or a memory for use in picture drawing by a printer. The MEM-P 212 includes the ROM 212a and the RAM 212b. The ROM 212a is a read-only memory for storing computer programs or data. The RAM 212b is a writable and readable memory used for loading computer programs or data or for picture processing performed by a printer.

The SB 214 is a bridge for connecting the NB 213, PCI devices, and peripheral devices to one another. The SB 214 is connected to the NB 213 via the PCI bus. A network interface (I/F) or the like is also connected to the PCI bus.

The ASIC 216 is an IC used for image processing including a hardware element for image processing. The ASIC 216 has a function as a bridge to connect the AGP bus 215, the PCI bus, the HDD 218, and the MEM-C 217. The ASIC 216 includes a PCI target and an AGP master, an arbiter (ARB) that is the center core of the ASIC 216, a memory controller that controls the MEM-C 217, a plurality of DMACs (Direct Memory Access Controller) that rotate image data by using hardware logic, and a PCI unit that performs data transfer with the engine unit 260 via the PCI bus. A FCU (Facsimile Control Unit) 230, a USB (Universal Serial Bus) 240, and an IEEE 1394 (the Institute of Electrical and Electronics Engineers 1394) I/F 250 are connected to the ASIC 216 via the PCI bus. The ASIC 216 is also connected to a host PC, a network, and the like (not illustrated). The operation display unit 220 is, for example, a touch panel. The operation display unit 220 receives input with respect to the controller 210 and displays a state of the image forming apparatus. The operation display unit 220 is directly connected to the ASIC 216.

The MEM-C 217 is a local memory for use as a copy image buffer and a code buffer. The HDD 218 is a storage device for storing image data, computer programs, font data, and forms.

The AGP bus 215 is a bus interface for a graphic accelerator card introduced to speed up graphics operation. The AGB bus 215 allows direct access to the MEM-P 212 with a high throughput to thereby speed up operation related to the graphic accelerator card.

A recording medium 219 is, for example, a write-once CD-R (Compact Disc Recordable), and is used to copy recorded computer programs or data onto the HDD 218.

Figure 13:
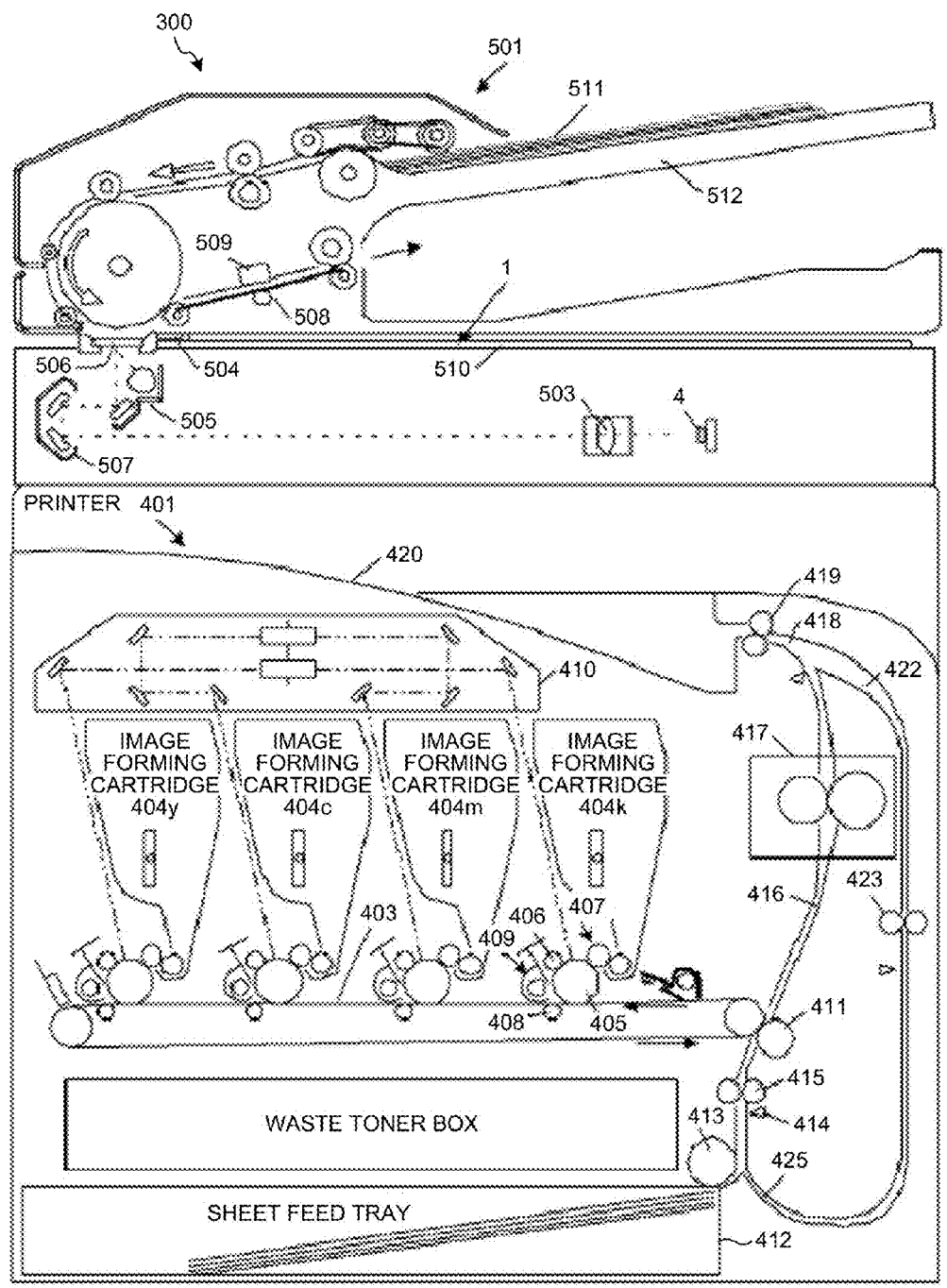
FIG. 13 is a side view illustrating a configuration example of the image forming apparatus including the image reading apparatus.

FIG. 13 is a side view illustrating a configuration example of an image forming apparatus 300 including the image reading apparatus 1. The image forming apparatus 300 is, for example, an MFP (Multifunction Peripheral). When a user designates a copy mode, the image forming apparatus 300 causes the image reading apparatus (scanner) 1 or an ADF (auto document feeder) 501 to read an image of a document, and causes the image reading apparatus 1 to print the read image. When a scanner (scanner distribution) mode is designated, the image forming apparatus 300 causes the image reading apparatus 1 or the ADF 501 to read an image of a document, and accumulates (stores) or transmits (distributes) the read image in/to an image storage memory of the image forming apparatus 300, a medium, or a designated external apparatus (a personal computer, a mobile terminal, a server, or an external printer). When receiving a print instruction from an external apparatus, the image forming apparatus 300 prints image information transmitted by the external apparatus.

An image forming mechanism (image forming unit) of a printer 401 includes a well-known color electrophotographic image forming process element, and includes image forming cartridges 404k to 404y for printing respective colors of K (black), C (cyan), M (magenta), and Y (yellow). Each of the image forming cartridges 404k to 404y is structured such that a charging roller 406, a toner developing unit 407 and a cleaner 409 are disposed around a photoreceptor drum 405. The image forming cartridges 404k to 404y are arranged in tandem at a predetermined pitch along a moving direction (sub-scanning direction) of a transfer belt 403. A laser scanner 410 is disposed above the image forming cartridges 404k to 404y. The laser scanner 410 radiates laser beams modulated based on image data for exposing images of the respective colors onto the photosensitive drums 405 charged by the charging rollers 406. The laser scanner 410 repeats scanning in the main-scanning direction perpendicular to the moving direction of the transfer belt 403. Therefore, electrostatic latent images are formed on the photosensitive drums 405. The electrostatic latent images are developed into toner images by toner developing units 407. The toner images of the respective colors on the photosensitive drums 405 are sequentially transferred on the transfer belt 403 in a superimposed manner by a transfer roller 408 so that the same color image can be formed. The superimposed toner images are transferred onto a sheet fed by a registration roller 415 at the position of a secondary transfer roller 411. The sheet carrying the transferred toner images is conveyed to a fixing device 417 through a feed path 416. The fixing device 417 applies heat and pressure to the sheet, so that the toner images are fixed to the sheet. The sheet that has passed through the fixing device 417 is conveyed onto a discharge tray 420 outside a discharge opening by a discharge roller 419 through a sheet discharge path 418.

When duplex printing is designated, the printer 401 conveys the sheet that has passed through the fixing device 417 to the discharge tray 420 outside the discharge opening by the discharge roller 419 via the sheet discharge path 418. The printer 401 stops normal rotation (rotation for discharging the sheet) of the discharge roller 419 before the rear end of the sheet being conveyed is separated from the discharge roller 419, and causes the discharge roller 419 to rotate in reverse (reverse rotation) while the rear end of the sheet is nipped by the discharge roller 419. The printer 401 feeds the sheet to a duplex conveying path with the rear end of the sheet ahead, and conveys the sheet to the registration roller 415 through a reverse sheet conveying path 425 so that the sheet abuts against and temporarily stops at the registration roller 415. The duplex conveying path is formed of, for example, the sheet discharge path 418, a return reverse path 422, a feed roller 423, and the reverse sheet conveying path 425. The registration roller 415 starts feed operation along with the movement of the transfer belt 403 such that the leading end of the sheet can arrive at the secondary transfer roller 411 when the start point of the toner image (the leading end of the image) transferred on the transfer belt 403 arrives at the secondary transfer roller 411. The sheet with the toner image transferred on the reverse side is conveyed to the fixing device 417 via the feed path 416. The fixing device 417 applies heat and pressure to the sheet, so that the toner image is fixed to the sheet. The sheet that has passed through the fixing device 417 is conveyed onto the discharge tray 420 outside the discharge opening by the discharge roller 419 through the sheet discharge path 418. Incidentally, the sheet is fed from a sheet feed tray 412 to a sheet feed path 414 by a sheet feed roller 413, and abuts against and temporarily stops at the registration roller 415. Then, the sheet is fed to the secondary transfer roller 411 by the registration roller 415 along with the movement of the toner image on the transfer belt 403.

The image reading apparatus 1 includes a reducing optical system as a first image reading means for reading the top side of a document. The reducing optical system includes a first carriage 505 mounted with a first mirror, a second carriage 507 mounted with the first mirror and a second mirror, a lens 503, and the imaging device 4. The image reading apparatus 1 also includes a reference white plate 504, a window glass 506 for sheet-through reading, and a contact glass 510 for flatbed reading (book reading).

Meanwhile, the ADF 501 includes an equal-magnification optical system (a CIS (contact image sensor) 509) as a second image reading means for reading the back side of a document. The ADF 501 also includes a white roller 508, a document tray 512, a pickup roller for separating documents 511 stacked on the document tray 512 one by one, a conveying roller for conveying the document, and the like. The white roller 508 is an approximately white roller with uniform density over the entire length of the window glass 506 in a main-scanning direction x, and is used to obtain correction data for performing shading correction when the CIS 509 of the equal-magnification optical system as the second image reading means reads the back side of a document.

In the case of the flatbed reading, a motor (not illustrated) as a drive source moves the first carriage 505 from the position just below the window glass 506 illustrated in FIG. 13 to the right in the sub-scanning direction in FIG. 13. In synchronization with the movement, the second carriage 507 is moved at a half of the moving speed of the first carriage 505 in the same direction. Specifically, the second carriage 507 is moved so that a path of the reflected light from the document can be constant between the top surface of the contact glass 510 and the imaging device 4. During a period from when the first carriage 505 (the first mirror) arrives at the position just below a start point of the document (the left end in FIG. 13) and to when the first carriage 505 arrives at the end point (the right end), the imaging device 4 converts image light into an image signal and a signal processing circuit (not illustrated) converts the image signal into a digital signal. That is, the image signal is converted into image data. The reference white plate 504 is an approximately white member with uniform density over the entire width of the contact glass 510 in the longitudinal direction, and is used to obtain correction data for performing shading correction in the flatbed reading.

When an image on the top side of a document is read by the sheet-through reading, the first carriage 505 is fixed and the document is conveyed. While the document is passing by the window glass 506, the imaging device 4 converts image light into an image signal and the signal processing circuit (not illustrated) converts the image signal into a digital signal.

In the case of the duplex reading, the CIS 509 of the equal-magnification optical system reads an image on the back side of the document while the image on the top side of the document is read by the sheet-through reading.

According to the embodiments, it is possible to prevent an overvoltage.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An imaging device comprising:
    a plurality of light-receiving units each including a plurality of pixels, each light-receiving unit being configured to perform photoelectric conversion in the pixels;
    a plurality of output units provided for the light-receiving units, each output unit sequentially converting charges of the respective pixels produced by the photoelectric conversion into voltages and sequentially outputting the voltages;
    a switching unit configured to switch between signal paths in accordance with a switching signal input from an external device so that at least one of the output units outputs the voltages; and
    an electric-potential applying unit configured to apply an offset potential to the voltages output by the output units until a predetermined time has elapsed since switching between the signal paths by the switching unit.

2. The imaging device according to claim 1, wherein the electric-potential applying unit receives the switching signal, and applies the offset potential to the voltages until a delay time by a delay circuit has elapsed since reception of the switching signal.

3. The imaging device according to claim 2, wherein the delay circuit delays a signal in synchronization with a shift pulse for transferring the charges accumulated by each light-receiving unit or in synchronization with a reset pulse for resetting the accumulated charges for each pixel.

4. The imaging device according to claim 1, wherein the electric-potential applying unit applies the offset potential to the voltages by being controlled based on a signal from an external device.

5. An image reading apparatus comprising:
    the imaging device according to claim 1; and
    a control unit configured to control the switching unit and the electric-potential applying unit.

6. The image reading apparatus according to claim 5, wherein
    the imaging device includes
        a plurality of shift gates configured to transfer the charges accumulated by the light-receiving units, respectively; and
        a plurality of transfer registers provided for the shift gates, respectively, each transfer register receiving the charges transferred from the corresponding shift gate and transferring the charges to the corresponding output unit, and
    the predetermined time is longer than a time that is obtained by multiplying a quotient, which is obtained by dividing a total amount of charges that can be accumulated in each light-receiving unit, the shift gate for the each light-receiving unit, and the transfer register for the each light-receiving unit by an amount of charges that can be accumulated in the transfer register, and a time needed for the transfer register to transfer all the accumulated charges at once.

7. An image forming apparatus comprising an image forming unit configured to form an image read by the image reading apparatus according to claim 5.

8. The imaging device according to claim 1, wherein the switching unit is a common switch that switches between signal paths of the plurality of light receiving units.

9. The imaging device according to claim 1, wherein the plurality of output units receive a switching signal inverted by the switching unit.

10. An image reading method comprising:
- receiving light at a plurality of light-receiving units, each of the plurality of light-receiving units including a plurality of pixels and performing photoelectric conversion;
- outputting voltages, via a plurality of output units, resulting from the photoelectric conversion;
- switching between signal paths in accordance with a switching signal from an external device so that at least one of the output units outputs the voltages; and
- applying an offset potential to a voltage output by an output unit until a predetermined time has elapsed since switching between the signal paths.

11. The image reading method according to claim 10, wherein switching further includes switching between signal paths of the plurality of light receiving units via a common switch.

12. The image reading method according to claim 10, further comprising receiving, at the plurality of output units, a switching signal inverted by the switching unit.

* * * * *